United States Patent
Kimura (10) Patent No.: US 8,456,581 B2
(45) Date of Patent: Jun. 4, 2013

(54) LIQUID CRYSTAL DISPLAY

(75) Inventor: Hiroyuki Kimura, Fukaya (JP)

(73) Assignee: Toshiba Mobile Display Co., Ltd., Tokyo (JP)

( * ) Notice: Subject to any disclaimer, the term of this patent is extended or adjusted under 35 U.S.C. 154(b) by 1006 days.

(21) Appl. No.: 12/497,277

(22) Filed: Jul. 2, 2009

(65) Prior Publication Data

US 2010/0013815 A1 Jan. 21, 2010

(30) Foreign Application Priority Data

Jul. 17, 2008 (JP) ................................ 2008-186263

(51) Int. Cl.
*G02F 1/1343* (2006.01)

(52) U.S. Cl.
USPC .............................................. 349/38; 349/41

(58) Field of Classification Search
USPC ...................................................... 349/38, 41
See application file for complete search history.

(56) References Cited

FOREIGN PATENT DOCUMENTS

| JP | 1-87561 | 6/1989 |
|----|---------|--------|
| JP | 2001-215892 | 8/2001 |
| JP | 2001-343912 | 12/2001 |
| JP | 2005-49849 | 2/2005 |
| JP | 2006-11405 | 1/2006 |
| JP | 2006-330711 | 12/2006 |
| TW | 200527012 | 8/2005 |
| TW | I243263 | 8/2005 |
| TW | I245255 | 12/2005 |

OTHER PUBLICATIONS

Official communication issued by Japan Patent Office, dated Oct. 2, 2012 for counterpart Japan Patent Application No. 2008-186263 (3 pages).

Official communication issued by Taiwan Patent Office, dated Sep. 7, 2012 for counterpart Taiwan Patent Application No. 098122829 (8 pages).

*Primary Examiner* — Lucy Chien

(74) *Attorney, Agent, or Firm* — Finnegan, Henderson, Farabow, Garrett & Dunner, LLP (57) ABSTRACT

A liquid crystal display includes an array substrate which includes a plurality of signal lines, a plurality of scanning lines, a plurality of auxiliary capacitive lines, a plurality of pixels, an auxiliary capacitive line driving circuit, a logic circuit, a first auxiliary capacitive voltage supply line, a second auxiliary capacitive voltage supply line, and a power supply line, an opposite substrate, and a liquid crystal layer. Each of the pixels includes a switching element, a pixel electrode, and an auxiliary capacitive element. A first common line and a second common line are connected to each other on one end side and are in a non-connected state in parts other than the part on the one end side. A common voltage is supplied to the first common line and the second common line from the one end side.

13 Claims, 8 Drawing Sheets

LIQUID CRYSTAL DISPLAY

CROSS-REFERENCE TO RELATED APPLICATIONS

This application is based upon and claims the benefit of priority from prior Japanese Patent Application No. 2008-186263, filed Jul. 17, 2008, the entire contents of which are incorporated herein by reference.

BACKGROUND OF THE INVENTION

1. Field of the Invention
This invention relates to a liquid crystal display.
2. Description of the Related Art Liquid crystal displays, for example, are generally used as displays for displaying images. A liquid crystal display comprises an array substrate, an opposite substrate arranged opposite to the array substrate with a gap therebetween, a liquid crystal layer held between the array substrate and the opposite substrate, and a plurality of pixels provided between the array substrate and the opposite substrate.

The array substrate includes a glass substrate. A plurality of signal lines and a plurality of scanning lines are arranged across each other on the glass substrate in such a manner as to divide the pixels. Each pixel has a thin film transistor (TFT) provided in the vicinity of each intersection of the signal line and the scanning line, a pixel electrode connected to the TFT, and an auxiliary capacitive element connected to the pixel electrode. The auxiliary capacitive element has an auxiliary capacitive line parallel to the scanning line, and an auxiliary capacitive electrode overlapping the auxiliary capacitive line via an insulating film. The auxiliary capacitive electrode is connected to the pixel electrode. The array substrate also includes an auxiliary capacitive line driving circuit and a logic circuit.

On the other hand, the opposite substrate includes a different glass substrate. An opposite electrode or the like is formed on the different glass substrate. The array substrate and the opposite substrate are arranged opposite to each other with a predetermined gap therebetween. The liquid crystal layer is formed between the array substrate and the opposite substrate.

If a voltage is constantly applied to the liquid crystal in the same direction, liquid crystal burning occurs. Therefore, a polarity reversal drive is generally performed to switch the voltage application polarity of the liquid crystal layer at a given period. The polarity reversal drive includes, for example, a dot reversal drive wherein the polarity is switched per pixel, a line reversal drive wherein the polarity is switched per line, and a frame reversal drive wherein the polarity is switched per frame.

In the case where the polarity reversal drive is performed, the polarity of the voltage of the signal lines and the polarity of the voltage of the auxiliary capacitive line connected to the auxiliary capacity have to be periodically changed. To this end, as disclosed in, for example, Jpn. Pat. Appln. KOKAI Publication No. 2005-49849, a first reference power supply and a second reference power supply are prepared in advance to set the voltage of the auxiliary capacitive line. The first reference power supply provides a positive voltage, and the second reference power supply provides a voltage of 0 V. As described above, here, a positive voltage and a voltage of 0 V are alternately applied to the auxiliary capacitive line frame by frame.

However, when the auxiliary capacitive line is switched between the first reference power supply and the second reference power supply frame by frame, noise occurs the auxiliary capacitive line during the charging or discharging of the pixels, resulting in the generation of noise in the power supplies as ripples.

Furthermore, along with the recent increase in the number of pixels, the manufacture of liquid crystal displays has been shifting from QVGA liquid crystal displays to VGA liquid crystal displays or WVGA liquid crystal displays. When the number of pixels is increased, noise is generated during writing into the pixels due to coupling with the auxiliary capacitive line. Moreover, the operation margin of the logic circuit is significantly decreased due to such noise.

BRIEF SUMMARY OF THE INVENTION

According to an aspect of the present invention, there is provided a liquid crystal display comprising:

an array substrate, the array substrate including a plurality of signal lines, a plurality of scanning lines, a plurality of auxiliary capacitive lines, a plurality of pixels provided in a display region where the signal lines, the scanning lines and the auxiliary capacitive lines intersect each other, an auxiliary capacitive line driving circuit which is connected to the auxiliary capacitive lines and which alternately supplies the auxiliary capacitive lines with a first auxiliary capacitive voltage and a second auxiliary capacitive voltage at given periods, the second auxiliary capacitive voltage being different in potential from the first auxiliary capacitive voltage, a logic circuit which drives the scanning lines and the auxiliary capacitive lines, a first auxiliary capacitive voltage supply line which extends within the auxiliary capacitive line driving circuit to form the auxiliary capacitive line driving circuit, one end side of the first auxiliary capacitive voltage supply line being located out of the auxiliary capacitive line driving circuit, the first auxiliary capacitive voltage being supplied to the first auxiliary capacitive voltage supply line from the one end side, a second auxiliary capacitive voltage supply line which extends within the auxiliary capacitive line driving circuit to form the auxiliary capacitive line driving circuit, one end side of the second auxiliary capacitive voltage supply line being located out of the auxiliary capacitive line driving circuit, the second auxiliary capacitive voltage being supplied to the second auxiliary capacitive voltage supply line from the one end side, and a power supply line which extends within the logic circuit to form the logic circuit, one end side of the power supply line being located out of the logic circuit;

an opposite substrate arranged opposite to the array substrate with a gap; and a liquid crystal layer held between the array substrate and the opposite substrate, wherein each of the pixels includes a switching element provided in the vicinity of an intersection of the signal line and the scanning line, a pixel electrode which is electrically connected to the switching element, and an auxiliary capacitive element including an auxiliary capacitive electrode which is arranged opposite to the auxiliary capacitive line via an insulating film and which is electrically connected to the pixel electrode, a first common line which is the first auxiliary capacitive voltage supply line or the second auxiliary capacitive voltage supply line and a second common line which is the power supply line are connected to each other on the one end side and are in a non-connected state in parts other than the part on the one end side, and a common voltage is supplied to the first common line and the second common line from the one end side.

According to another aspect of the present invention, there is provided a liquid crystal display comprising:

an array substrate, the array substrate including a plurality of signal lines, a plurality of scanning lines, a plurality of auxiliary capacitive lines, a plurality of pixels provided in a display region where the signal lines, the scanning lines and the auxiliary capacitive lines intersect each other, an auxiliary capacitive line driving circuit which is connected to the auxiliary capacitive lines and which alternately supplies the auxiliary capacitive lines with a first auxiliary capacitive voltage and a second auxiliary capacitive voltage at given periods, the second auxiliary capacitive voltage being different in potential from the first auxiliary capacitive voltage, a logic circuit which drives the scanning lines and the auxiliary capacitive lines, a first auxiliary capacitive voltage supply line which extends within the auxiliary capacitive line driving circuit to form the auxiliary capacitive line driving circuit, one end side of the first auxiliary capacitive voltage supply line being located out of the auxiliary capacitive line driving circuit, the first auxiliary capacitive voltage being supplied to the first auxiliary capacitive voltage supply line from the one end side, a second auxiliary capacitive voltage supply line which extends within the auxiliary capacitive line driving circuit to form the auxiliary capacitive line driving circuit, one end side of the second auxiliary capacitive voltage supply line being located out of the auxiliary capacitive line driving circuit, the second auxiliary capacitive voltage being supplied to the second auxiliary capacitive voltage supply line from the one end side, a high-level power supply line which extends within the logic circuit to form the logic circuit, one end side of the high-level power supply line being located out of the logic circuit, a high-level voltage being supplied to the high-level power supply line from the one end side, and a low-level power supply line which extends within the logic circuit to form the logic circuit, one end side of the low-level power supply line being located out of the logic circuit, a low-level voltage being supplied to the low-level power supply line from the one end side;

an opposite substrate arranged opposite to the array substrate with a gap; and a liquid crystal layer held between the array substrate and the opposite substrate, wherein each of the pixels includes a switching element provided in the vicinity of an intersection of the signal line and the scanning line, a pixel electrode which is electrically connected to the switching element, and an auxiliary capacitive element including an auxiliary capacitive electrode which is arranged opposite to the auxiliary capacitive line via an insulating film and which is electrically connected to the pixel electrode, a first common line which is the first auxiliary capacitive voltage supply line or the second auxiliary capacitive voltage supply line and a second common line which is the high-level power supply line or the low-level power supply line are connected to each other on the one end side and are in a non-connected state in parts other than the part on the one end side, and a common voltage is supplied to the first common line and the second common line from the one end side.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A liquid crystal display according to an embodiment of this invention will hereinafter be described in detail with reference to the drawings.

Figure 1:
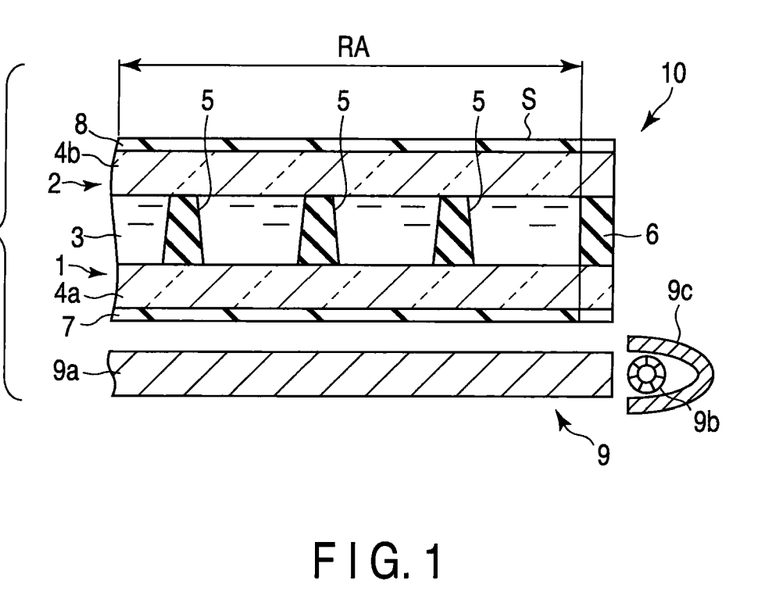
FIG. 1 is a sectional view showing a liquid crystal display according to an embodiment of the invention.

As shown in FIG. 1, the liquid crystal display comprises a liquid crystal display panel 10. The liquid crystal display panel 10 includes an array substrate 1, an opposite substrate 2 arranged opposite to the array substrate with a predetermined gap, and a liquid crystal layer 3 held between these substrates. The liquid crystal display also comprises a first optical component 7 disposed on the external surface of the array substrate 1, a second optical component 8 disposed on the external surface of the opposite substrate 2, and a backlight unit 9. The liquid crystal display has a display region RA where pixels 18 described later are arranged in a matrix form.

Figure 2:
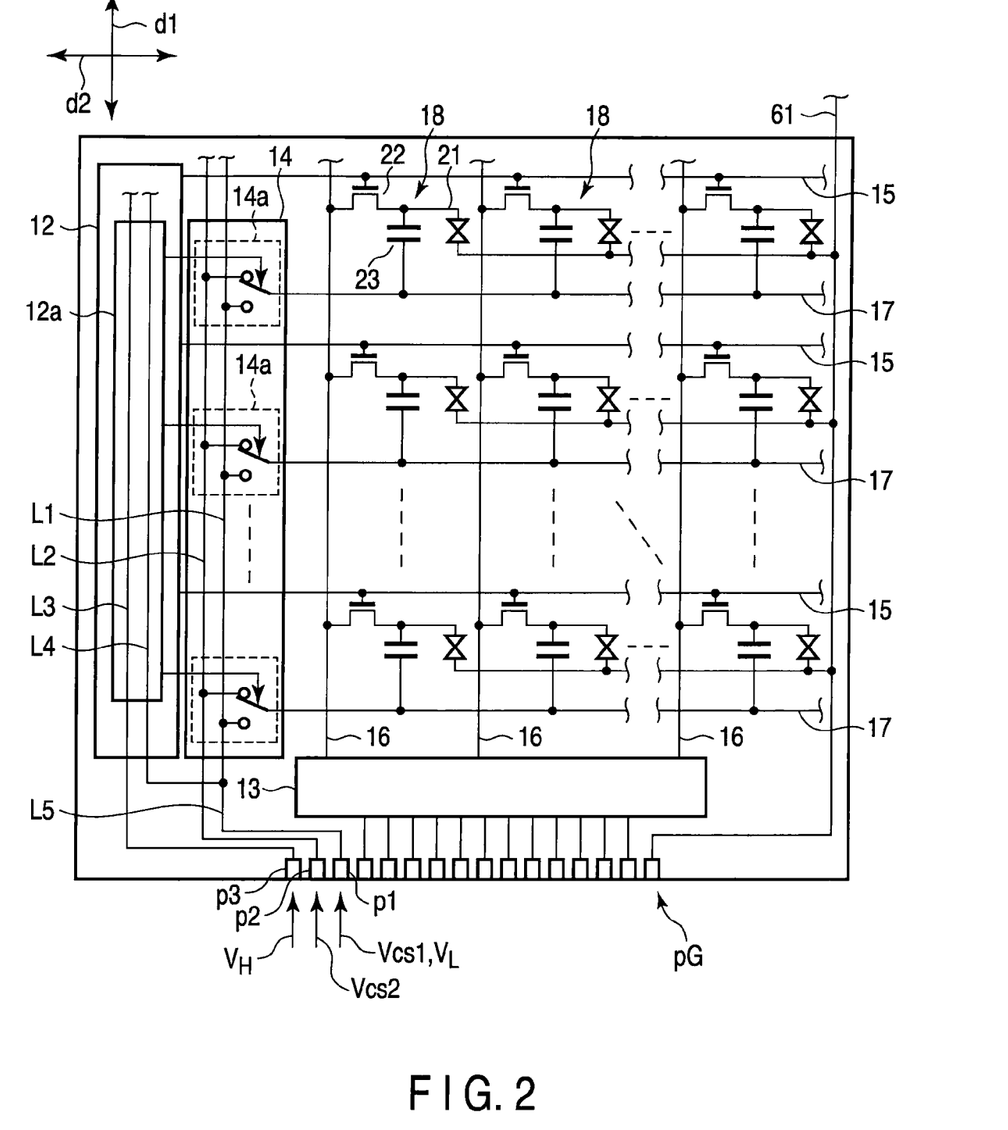
FIG. 2 is a plan view showing a schematic configuration of an array substrate shown in FIG. 1.

As shown in FIGS. 1 and 2, the array substrate 1 includes, for example, a glass substrate 4a as a transparent insulating substrate. In the display region RA, the pixels 18 are formed on the glass substrate 4a. Outside the display region RA, a scanning line driving circuit 12, a signal line driving circuit 13, an auxiliary capacitive line driving circuit 14, and a pad group (hereinafter referred to as an OLB pad group) pG of an outer lead bonding are formed on the glass substrate 4a. The scanning line driving circuit 12 has a logic circuit 12a. The auxiliary capacitive line driving circuit 14 has a plurality of auxiliary capacitive power supply selecting circuits 14a.

In the display region RA, a plurality of scanning lines 15 and a plurality of signal lines 16 perpendicular to the scanning lines are arranged on the glass substrate 4a. A plurality of auxiliary capacitive lines 17 parallel to the scanning lines 15 are formed on the glass substrate 4a. The signal lines 16 extend in a first direction d1. The scanning lines 15 and the auxiliary capacitive lines 17 extend in a second direction d2 perpendicular to the first direction d1.

In this embodiment, a pixel 18 is formed in each region enclosed by the adjacent two signal lines 16 and the adjacent two auxiliary capacitive lines 17. The pixels 18 are arranged in a matrix form.

Next, one extracted pixel 18 is described in detail.

Figure 3:
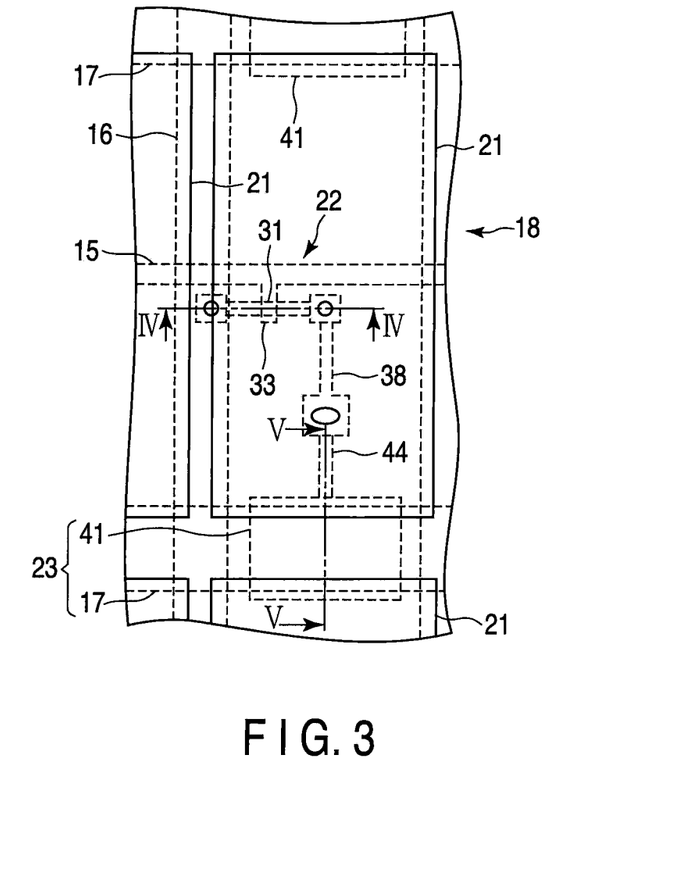
FIG. 3 is an enlarged plan view showing part of the array substrate shown in FIGS. 1 and 2, and showing the wiring structure of pixels in particular.
Figure 4:
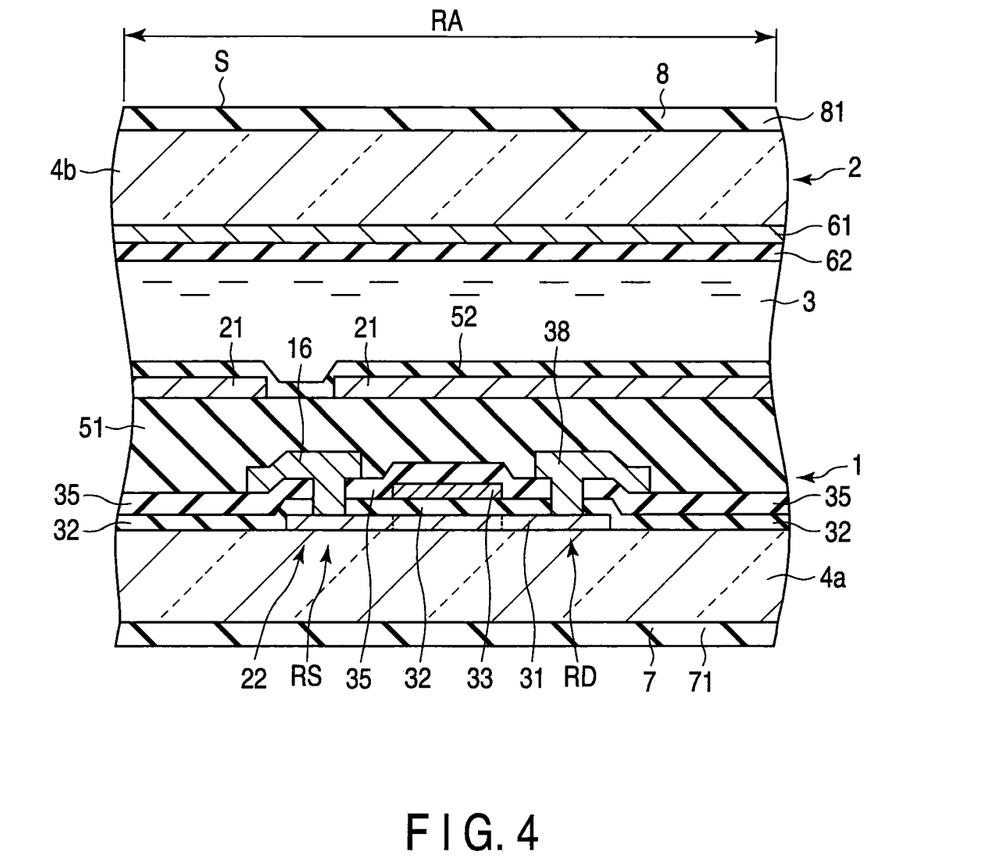
FIG. 4 is a sectional view of the liquid crystal display shown in FIG. 3 along the line IV-IV.

As shown in FIGS. 2, 3 and 4, the pixel 18 has a pixel electrode 21, a thin film transistor (TFT) 22 as a switching element, and an auxiliary capacitive element 23. The TFT 22 is connected to the pixel electrode 21.

A semiconductor layer 31 is formed on the glass substrate 4a, and a gate insulating film 32 is formed on the glass substrate and the semiconductor layer. In each region overlapping the semiconductor layer 31, a gate electrode 33, which is an extended portion of the scanning line 15, is formed on the gate insulating film 32. An interlayer insulating film 35 is formed on the gate insulating film 32 and the gate electrode 33.

The signal line 16 and a contact line 38 are formed on the interlayer insulating film 35. The signal line and the contact line 38 are connected to the semiconductor layer 31 through parts of the gate insulating film 32 and the interlayer insulating film 35. Here, the signal line 16 is connected to a source region RS of the semiconductor layer 31, and the contact line 38 is connected to a drain region RD of the semiconductor layer 31.

Figure 5:
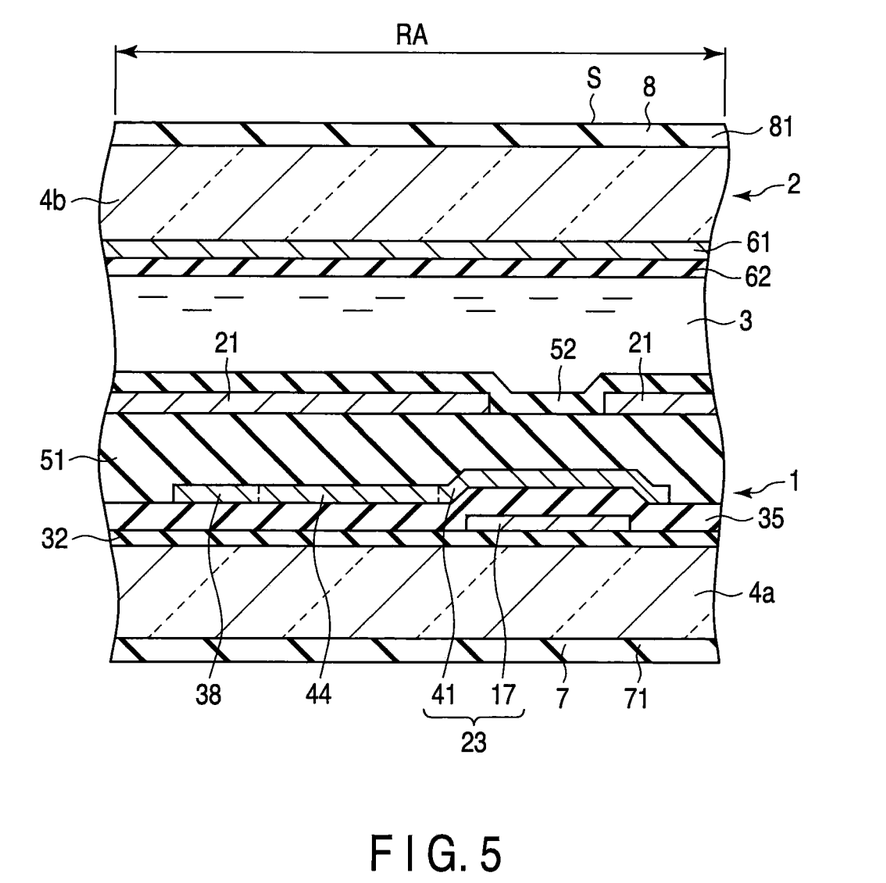
FIG. 5 is a sectional view of the liquid crystal display shown in FIG. 3 along the line V-V.

Next, the auxiliary capacitive element 23 is described. As shown in FIGS. 2, 3 and 5, the auxiliary capacitive line 17 and an auxiliary capacitive electrode 41 form the auxiliary capacitive element 23.

The auxiliary capacitive line 17 is formed by, for example, aluminum as a conducting material on the gate insulating film 32. The interlayer insulating film 35 is formed on the gate insulating film 32 and the auxiliary capacitive line 17.

In the auxiliary capacitive element 23, the auxiliary capacitive electrode 41 overlapping the auxiliary capacitive line 17 and a connection line 44 connected to the auxiliary capacitive electrode 41 are formed on the interlayer insulating film 35. The connection line 44 connects the auxiliary capacitive element 23 and the pixel electrode 21.

The auxiliary capacitive electrode 41, the connection line 44, the contact line 38 and the signal line 16 are formed of the same conducting material. The auxiliary capacitive electrode 41, the connection line 44 and the contact line 38 are integrally formed.

As shown in FIGS. 4 and 5, a plurality of red, green and blue colored layers 51 are formed on the glass substrate 4a on which the TFT 22 and the auxiliary capacitive element 23 are formed. The plurality of pixel electrodes 21 are formed on the colored layers 51. The pixel electrodes 21 are formed so that their peripheral edges overlap the adjacent two signal lines 16 and the adjacent two auxiliary capacitive lines 17. An alignment film 52 is formed on the colored layers 51 and the pixel electrodes 21 such that the array substrate 1 is formed.

As shown in FIGS. 1, 4 and 5, the opposite substrate 2 includes, for example, a glass substrate 4b as a transparent insulating substrate. An opposite electrode 61 and an alignment film 62 are formed in order on the glass substrate 4b, so that the opposite substrate 2 is formed.

As shown in FIG. 1, the space between the array substrate 1 and the opposite substrate 2 is held by, for example, columnar spacers 5. The array substrate 1 and the opposite substrate 2 are bonded together by a sealing member 6 disposed at the peripheral edges of these substrates.

As shown in FIGS. 1, 4 and 5, the first optical component 7 is disposed on the external surface of the glass substrate 4a. In this embodiment, the first optical component 7 is formed by a polarizing plate 71. The second optical component 8 is disposed on the external surface of the glass substrate 4b. In this embodiment, the second optical component 8 is formed by a polarizing plate 81. The external surface of the polarizing plate 81 is a display surface S.

The backlight unit 9 is disposed on the external side of the first optical component 7. This backlight unit 9 has a light guiding plate 9a arranged opposite to the array substrate 1, and a light source 9b and a reflecting plate 9c arranged opposite to one edge of the light guiding plate.

The liquid crystal display is formed as described above.

Next, the scanning line driving circuit 12, the signal line driving circuit 13, the auxiliary capacitive line driving circuit 14 and the OLB pad group pG are described.

As shown in FIG. 2, the OLB pad group pG is formed of a plurality of pads aligned along the peripheral edge of the array substrate 1 (the glass substrate 4a). The opposite electrode 61 is connected to the pad, and a predetermined voltage is applied to the opposite electrode 61 via the pad.

The signal line driving circuit 13 is connected to the plurality of signal lines 16. The signal line driving circuit 13 is also connected to the plurality of pads. A video signal, for example, is transmitted to the signal line driving circuit 13 via the plurality of pads.

The auxiliary capacitive line driving circuit 14 is connected to the plurality of auxiliary capacitive lines 17, and alternately supplies the plurality of auxiliary capacitive lines 17 with a first auxiliary capacitive voltage Vsc1 as the first reference power supply and a second auxiliary capacitive voltage Vcs2 as the second reference power supply at given periods. The second auxiliary capacitive voltage Vcs2 is different in potential from the first auxiliary capacitive voltage Vsc1. In this embodiment, the above-mentioned given period is equal to one frame.

The scanning line driving circuit 12 is connected to the plurality of scanning lines 15, and provides a scanning line signal to the plurality of scanning lines 15. The logic circuit 12a drives the plurality of scan lines 15 and the plurality of auxiliary capacitive lines 17.

Furthermore, in the array substrate 1 (the glass substrate 4a), there are formed a first auxiliary capacitive voltage supply line L1, a second auxiliary capacitive voltage supply line L2, a high (H)-level power supply line L3 as a power supply line, and a low (L)-level power supply line L4 as a power supply line.

The first auxiliary capacitive voltage supply line L1 extends within the auxiliary capacitive line driving circuit 14 to form the auxiliary capacitive line driving circuit. One end side of the first auxiliary capacitive voltage supply line L1 is located out of the auxiliary capacitive line driving circuit 14 and connected to a pad p1. The first auxiliary capacitive voltage Vsc1 is supplied to the first auxiliary capacitive voltage supply line L1 from the one end side via the pad p1.

The second auxiliary capacitive voltage supply line L2 extends within the auxiliary capacitive line driving circuit 14 to form the auxiliary capacitive line driving circuit. One end side of the second auxiliary capacitive voltage supply line L2 is located out of the auxiliary capacitive line driving circuit 14 and connected to a pad p2. The second auxiliary capacitive voltage Vcs2 is supplied to the second auxiliary capacitive voltage supply line L2 from the one end side via the pad p2.

The H-level power supply line L3 extends within the logic circuit 12a to form the logic circuit. One end side of the H-level power supply line L3 is located out of the logic circuit 12a and connected to a pad p3. A high (H)-level voltage $V_H$ is supplied as an H-level power supply to the H-level power supply line L3 from the one end side via the pad p3.

The L-level power supply line L4 extends within the logic circuit 12a to form the logic circuit. One end side of the L-level power supply line L4 is located out of the logic circuit 12a and connected to the pad p1. A low (L)-level voltage $V_L$ is supplied as an L-level power supply to the L-level power supply line L4 from the one end side via the pad p1.

The first auxiliary capacitive voltage supply line L1 as a first common line and the L-level power supply line L4 as a second common line are connected to each other on the one end side (on the side of the pad p1), and are in a non-connected state in parts other than the part on the one end side. In addition, the logic circuit 12a includes an unshown smoothing condenser, and the first auxiliary capacitive voltage supply line L1 and the L-level power supply line L4 are connected to each other in the vicinity of the smoothing condenser.

The first auxiliary capacitive voltage supply line L1 and the L-level power supply line L4 are connected to the common pad p1. A common voltage is supplied to the first auxiliary capacitive voltage supply line L1 and the L-level power supply line L4 from the one end side via the pad p1. Thus, the first auxiliary capacitive voltage Vsc1 and the L-level voltage $V_L$ are a common voltage.

In this embodiment, the second auxiliary capacitive voltage Vcs2 and the H-level voltage $V_H$ are positive voltages. The first auxiliary capacitive voltage Vsc1 and the L-level voltage $V_L$ are 0 volts. The first auxiliary capacitive voltage supply line L1 and the L-level power supply line L4 are grounded on the one end side. The pad p1 is grounded.

Figure 6:
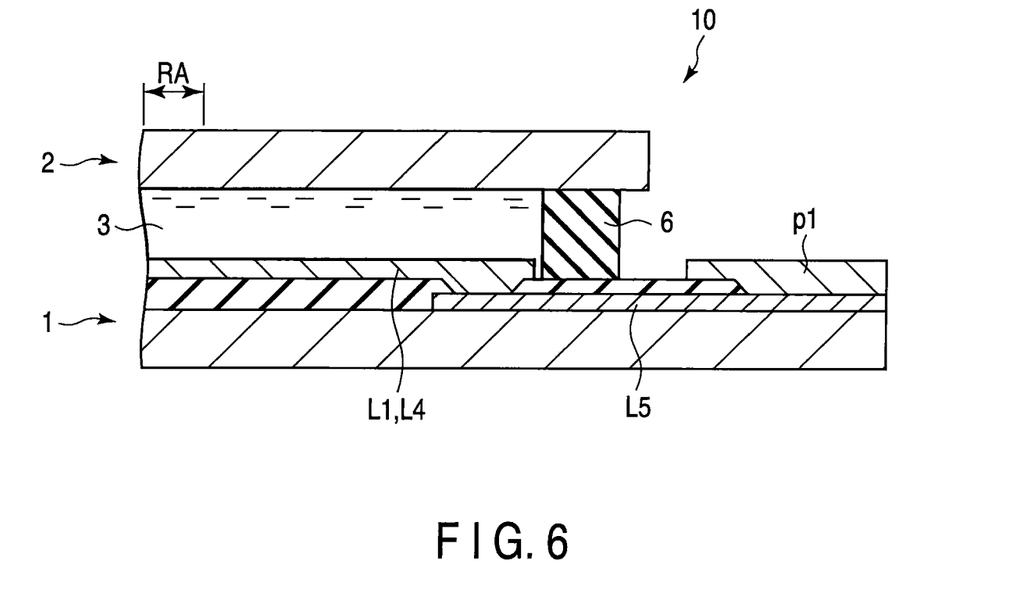
FIG. 6 is a sectional view showing the peripheral edge of the liquid crystal display, and showing, in particular, the connection of a first auxiliary capacitive voltage supply line, an L-level power supply line, a connection wiring line and a pad.

To explain in more detail, the first auxiliary capacitive voltage supply line L1 and the L-level power supply line L4 are connected to the pad p1 via a connection line L5, as shown in FIGS. 2 and 6. The connection line L5 is connected to the pad p1, and extends toward the display region RA beyond the sealing member 6. The one end side of the first auxiliary capacitive voltage supply line L1 and the one end side of the L-level power supply line L4 are connected to the connection line L5 in a region between the peripheral edge of the display region RA and the sealing member 6. Thus, a common voltage (0 volts) is supplied to the first auxiliary capacitive voltage supply line L1 and the L-level power supply line L4 via the pad p1 and the connection line L5.

Figure 7:
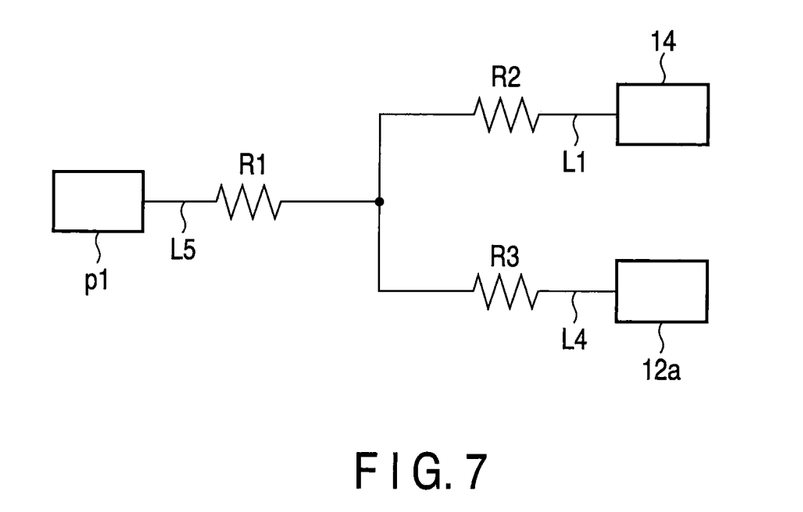
FIG. 7 is an explanatory diagram showing the relationship between the value of electric resistance ranging from the pad to an auxiliary capacitive line driving circuit and the value of electric resistance ranging from the pad to a logic circuit.

Furthermore, as shown in FIG. 7, the value of electric resistance ranging from the grounded portion (the pad p1) to the auxiliary capacitive line driving circuit 14 through the first auxiliary capacitive voltage supply line L1 is set to be lower than the value of electric resistance ranging from the grounded portion (the pad p1) to the logic circuit 12a through the L-level power supply line L4. Thus, the relationship among electric resistance values R1, R2 and R3 is: R1<R3, and R2<R3.

Figure 8:
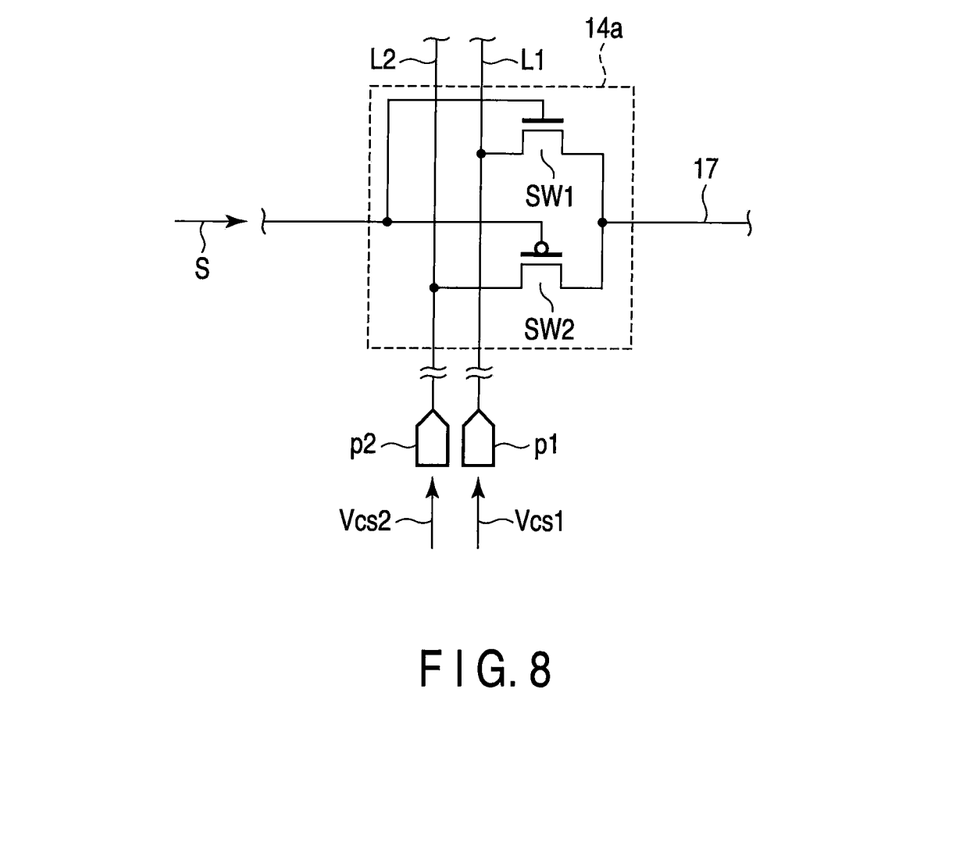
FIG. 8 is a schematic diagram showing an auxiliary capacitive power supply selecting circuit of the auxiliary capacitive line driving circuit.

As shown in FIGS. 2 and 8, the auxiliary capacitive power supply selecting circuits 14a are provided to correspond to the auxiliary capacitive lines 17. The auxiliary capacitive power supply selecting circuit 14a has an NMOS transistor SW1 as a switching element for selecting whether to provide the first auxiliary capacitive voltage Vsc1 to the auxiliary capacitive line 17, and a PMOS transistor SW2 as a switching element for selecting whether to provide the second auxiliary capacitive voltage Vcs2 (>Vsc1) to the auxiliary capacitive line 17. The NMOS transistor SW1 and the PMOS transistor SW2 are switched on or off on the basis of a polarity reversal control signal S from the logic circuit 12a.

According to the liquid crystal display having the configuration described above, the array substrate 1 has the plurality of signal lines 16, the plurality of scanning lines 15, the plurality of auxiliary capacitive lines 17, the plurality of pixels 18, the auxiliary capacitive line driving circuit 14, the logic circuit 12a, the first auxiliary capacitive voltage supply line L1, the second auxiliary capacitive voltage supply line L2, the H-level power supply line L3 and the L-level power supply line L4. The pixel 18 has the TFT 22, the pixel electrode 21 and the auxiliary capacitive element 23.

The first auxiliary capacitive voltage supply line L1 and the L-level power supply line L4 are connected to each other on the one end side (on the side of the pad p1), and are in a non-connected state in parts other than the part on the one end side. The pad p1 is grounded. A common voltage of 0 V is supplied to the first auxiliary capacitive voltage supply line L1 and the L-level power supply line L4 from the one end side via the pad p1.

Since the first auxiliary capacitive voltage supply line L1 and the L-level power supply line L4 are connected to each other on the one end side (on the side of the pad p1), a line (GND line) can be strengthened, that is to say, the voltage value of the first auxiliary capacitive voltage supply line L1 and the L-level power supply line L4 can be stabilized. Moreover, since the first auxiliary capacitive voltage supply line L1 and the L-level power supply line L4 are in a non-connected state in parts other than the part on the one end side, the effect of noise of the auxiliary capacitive line driving circuit 14 on the logic circuit 12a can be restrained.

In addition, since the first auxiliary capacitive voltage supply line L1 and the L-level power supply line L4 are connected to each other in the vicinity of the smoothing condenser of the logic circuit 12a, the effect of noise on the logic circuit 12a can be minimized.

Accordingly, the operation margin of the logic circuit 12a can be widened.

The value of electric resistance ranging from the grounded portion to the auxiliary capacitive line driving circuit 14 through the first auxiliary capacitive voltage supply line L1 is lower than the value of electric resistance ranging from the grounded portion to the logic circuit 12a through the L-level power supply line L4. This makes it possible to further restrain the effect of noise on the logic circuit 12a.

Furthermore, the first auxiliary capacitive voltage supply line L1 and the L-level power supply line L4 are connected to the common pad p1. Therefore, the number of probes in an inspection apparatus, for example, can be reduced as compared with the case where the first auxiliary capacitive voltage supply line L1 and the L-level power supply line L4 are connected to different pads. This makes it possible to reduce the cost of the inspection apparatus and thus inhibit a product price increase.

Consequently, it is possible to provide a liquid crystal display having high display quality wherein noise transmitted to a logic circuit can be restrained and the operation margin of the logic circuit can be widened.

It is to be noted that this invention is not exclusively limited to the embodiment described above and modifications of components can be made and embodied at the stage of carrying out the invention without departing from the spirit thereof. Moreover, suitable combinations of a plurality of components disclosed in the embodiment described above permit various inventions to be formed. For example, some of all the components shown in the embodiment may be eliminated.

Figure 9:
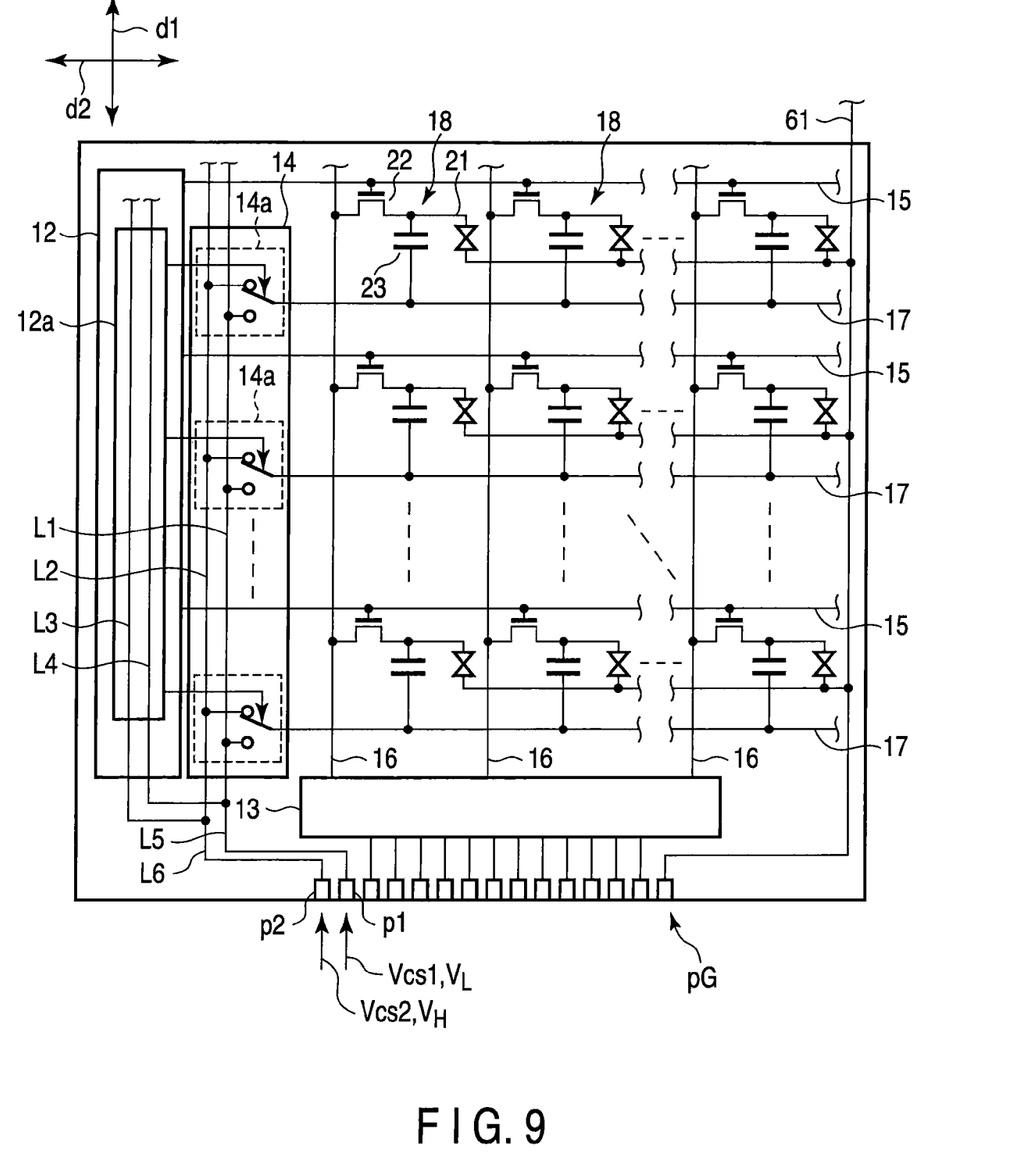
FIG. 9 is a plan view showing a modification of the configuration of the array substrate in the liquid crystal display.

For example, as shown in FIG. 9, if the second auxiliary capacitive voltage Vcs2 and the H-level voltage $V_H$ can be replaced with a common voltage, the second auxiliary capacitive voltage supply line L2 as a first common line and the H-level power supply line L3 as a second common line may be connected to each other on the one end side (on the side of the pad p2) and may be in a non-connected state in parts other than the part on the one end side. The second auxiliary capacitive voltage supply line L2 and the H-level power supply line L3 are connected to the common pad p2.

To explain more specifically, the second auxiliary capacitive voltage supply line L2 and the H-level power supply line L3 are connected to the pad p2 via a connection line L6. The connection line L6 is connected to the pad p2, and extends toward the display region RA beyond the sealing member 6. One end side of the second auxiliary capacitive voltage supply line L2 and one end side of the H-level power supply line L3 are connected to the connection line L6 in a region between the peripheral edge of the display region RA and the sealing member 6. Thus, a common voltage (positive voltage) is supplied to the second auxiliary capacitive voltage supply line L2 and the H-level power supply line L3 via the pad p2 and the connection line L6.

In the case described above, since the second auxiliary capacitive voltage supply line L2 and the H-level power supply line L3 are connected to each other on the one end side (on the side of the pad p2), a line (H power supply line) can be strengthened, that is to say, the voltage value of the second auxiliary capacitive voltage supply line L2 and the H-level power supply line L3 can be stabilized. Moreover, since the second auxiliary capacitive voltage supply line L2 and the H-level power supply line L3 are in a non-connected state in parts other than the part on the one end side, the effect of noise of the auxiliary capacitive line driving circuit 14 on the logic circuit 12a can be further restrained.

The first auxiliary capacitive voltage Vsc1 and the L-level voltage $V_L$ are not limited to 0 V and may have any other value. If first auxiliary capacitive voltage Vsc1 and the L-level voltage $V_L$ can be set to a common voltage value, the first auxiliary capacitive voltage supply line L1 and the L-level power supply line L4 can be connected to each other as described above.

What is claimed is:

1. A liquid crystal display comprising:
an array substrate, the array substrate including a plurality of signal lines, a plurality of scanning lines, a plurality of auxiliary capacitive lines, a plurality of pixels provided in a display region where the signal lines, the scanning lines and the auxiliary capacitive lines intersect each other, an auxiliary capacitive line driving circuit which is connected to the auxiliary capacitive lines and which alternately supplies the auxiliary capacitive lines with a first auxiliary capacitive voltage and a second auxiliary capacitive voltage at given periods, the second auxiliary capacitive voltage being different in potential from the first auxiliary capacitive voltage, a logic circuit which drives the scanning lines and the auxiliary capacitive lines, a first auxiliary capacitive voltage supply line which extends within the auxiliary capacitive line driving circuit to form the auxiliary capacitive line driving circuit, one end side of the first auxiliary capacitive voltage supply line being located out of the auxiliary capacitive line driving circuit, the first auxiliary capacitive voltage being supplied to the first auxiliary capacitive voltage supply line from the one end side, a second auxiliary capacitive voltage supply line which extends within the auxiliary capacitive line driving circuit to form the auxiliary capacitive line driving circuit, one end side of the second auxiliary capacitive voltage supply line being located out of the auxiliary capacitive line driving circuit, the second auxiliary capacitive voltage being supplied to the second auxiliary capacitive voltage supply line from the one end side, and a power supply line which extends within the logic circuit to form the logic circuit, one end side of the power supply line being located out of the logic circuit;
an opposite substrate arranged opposite to the array substrate with a gap; and
a liquid crystal layer held between the array substrate and the opposite substrate;
wherein each of the pixels includes a switching element provided in the vicinity of an intersection of the signal line and the scanning line, a pixel electrode which is electrically connected to the switching element, and an auxiliary capacitive element including an auxiliary capacitive electrode which is arranged opposite to the auxiliary capacitive line via an insulating film and which is electrically connected to the pixel electrode;
a first common line which is the first auxiliary capacitive voltage supply line or the second auxiliary capacitive voltage supply line and a second common line which is the power supply line are connected to each other on the one end side and are in a non-connected state in parts other than the part on the one end side;
a common voltage is supplied to the first common line and the second common line from the one end side:
the array substrate further includes another power supply line which extends within the logic circuit to form the logic circuit, one end side of the other power supply line being located out of the logic circuit;
one of the power supply line and the other power supply line is a high-level power supply line to which a high-level voltage is supplied from the one end side, and the other is a low-level power supply line to which a low-level voltage is supplied from the one end side;
the first auxiliary capacitive voltage and the high-level voltage are positive voltages;
the second auxiliary capacitive voltage and the low-level voltage are 0 volts;
the second auxiliary capacitive voltage supply line and the low-level power supply line are connected to each other on the one end side and are in a non-connected state in parts other than the part on the one end side; and
the second auxiliary capacitive voltage supply line and the low-level power supply line are grounded on the one end side.

2. The liquid crystal display according to claim 1, wherein:
the array substrate further includes a plurality of pads provided outside the display region;
the first common line and the second common line are connected to a common pad of the pads on the one end side; and
the common voltage is supplied to the first common line and the second common line via the common pad.

3. The liquid crystal display according to claim 1, wherein the value of electric resistance ranging from a grounded portion to the auxiliary capacitive line driving circuit through the second auxiliary capacitive voltage supply line is lower than the value of electric resistance ranging from the grounded portion to the logic circuit through the low-level power supply line.

4. The liquid crystal display according to claim 1, further comprising a sealing member provided around the display region and formed between the array substrate and the opposite substrate,
wherein the array substrate further includes:
a plurality of pads provided outside the display region and the sealing member; and
a connection line which is connected to one of the pads and which extends toward the display region beyond the sealing member,
one end side of the first common line and one end side of the second common line being connected to the connection line in a region between the peripheral edge of the display region and the sealing member, the common voltage being supplied to the first common line and the second common line via the pad and the connection line.

5. A liquid crystal display comprising:

an array substrate, the array substrate including a plurality of signal lines, a plurality of scanning lines, a plurality of auxiliary capacitive lines, a plurality of pixels provided in a display region where the signal lines, the scanning lines and the auxiliary capacitive lines intersect each other, an auxiliary capacitive line driving circuit which is connected to the auxiliary capacitive lines and which alternately supplies the auxiliary capacitive lines with a first auxiliary capacitive voltage and a second auxiliary capacitive voltage at given periods, the second auxiliary capacitive voltage being different in potential from the first auxiliary capacitive voltage, a logic circuit which drives the scanning lines and the auxiliary capacitive lines, a first auxiliary capacitive voltage supply line which extends within the auxiliary capacitive line driving circuit to form the auxiliary capacitive line driving circuit, one end side of the first auxiliary capacitive voltage supply line being located out of the auxiliary capacitive line driving circuit, the first auxiliary capacitive voltage being supplied to the first auxiliary capacitive voltage supply line from the one end side, a second auxiliary capacitive voltage supply line which extends within the auxiliary capacitive line driving circuit to form the auxiliary capacitive line driving circuit, one end side of the second auxiliary capacitive voltage supply line being located out of the auxiliary capacitive line driving circuit, the second auxiliary capacitive voltage being supplied to the second auxiliary capacitive voltage supply line from the one end side, and a power supply line which extends within the logic circuit to form the logic circuit, one end side of the power supply line being located out of the logic circuit;

an opposite substrate arranged opposite to the array substrate with a gap; and a liquid crystal layer held between the array substrate and the opposite substrate, wherein each of the pixels includes a switching element provided in the vicinity of an intersection of the signal line and the scanning line, a pixel electrode which is electrically connected to the switching element, and an auxiliary capacitive element including an auxiliary capacitive electrode which is arranged opposite to the auxiliary capacitive line via an insulating film and which is electrically connected to the pixel electrode;

a first common line which is the first auxiliary capacitive voltage supply line or the second auxiliary capacitive voltage supply line and a second common line which is the power supply line are connected to each other on the one end side and are in a non-connected state in parts other than the part on the one end side;

a common voltage is supplied to the first common line and the second common line from the one end side;

the array substrate further includes another power supply fine which extends within the logic circuit to form the logic circuit, one end side of the other power supply line being located out of the logic circuit;

one of the power supply line and the other power supply line is a high-level power supply fine to which a high-level voltage is supplied from the one end side, and the other is a low-level power supply line to which a low-level voltage is supplied from the one end side;

the first auxiliary capacitive voltage and the high-level voltage are positive voltages;

the second auxiliary capacitive voltage and the low-level voltage are 0 volts;

the first auxiliary capacitive voltage supply line and the high-level power supply line are connected to each other on the one end side and are in a non-connected state in parts other than the part on the one end side;

a common positive voltage is supplied to the first auxiliary capacitive voltage supply line and the high-level power supply line from the one end side; and the second auxiliary capacitive voltage supply line and the low-level power supply line are connected to each other on the one end side, are grounded, and are in a non-connected state in parts other than the part on the one end side.

6. The liquid crystal display according to claim 5, wherein:

the array substrate further includes a plurality of pads provided outside the display region;

the first common line and the second common line are connected to a common pad of the pads on the one end side; and the common voltage is supplied to the first common line and the second common line via the common pad.

7. The liquid crystal display according to claim 5, wherein the value of electric resistance ranging from a grounded portion to the auxiliary capacitive line driving circuit through the second auxiliary capacitive voltage supply line is lower than the value of electric resistance ranging from the grounded portion to the logic circuit through the low-level power supply line.

8. The liquid crystal display according to claim 5, further comprising a sealing member provided around the display region and formed between the array substrate and the opposite substrate, wherein the array substrate further includes a plurality of pads provided outside the display region and the sealing member;

a connection line which is connected to one of the pads and which extends toward the display region beyond the sealing member, one end side of the first common line and one end side of the second common line being connected to the connection line in a region between the peripheral edge of the display region and the sealing member, the common voltage being supplied to the first common line and the second common line via the pad and the connection line.

9. A liquid crystal display comprising:

an array substrate, the array substrate including a plurality of signal lines, a plurality of scanning lines, a plurality of auxiliary capacitive lines, a plurality of pixels provided in a display region where the signal lines, the scanning lines and the auxiliary capacitive lines intersect each other, an auxiliary capacitive line driving circuit which is connected to the auxiliary capacitive lines and which alternately supplies the auxiliary capacitive lines with a first auxiliary capacitive voltage and a second auxiliary capacitive voltage at given periods, the second auxiliary capacitive voltage being different in potential from the first auxiliary capacitive voltage, a logic circuit which drives the scanning lines and the auxiliary capacitive lines, a first auxiliary capacitive voltage supply line which extends within the auxiliary capacitive line driving circuit to form the auxiliary capacitive line driving circuit, one end side of the first auxiliary capacitive voltage supply line being located out of the auxiliary capacitive line driving circuit, the first auxiliary capacitive voltage being supplied to the first auxiliary capacitive voltage supply line from the one end side, a second auxiliary capacitive voltage supply line which extends within the auxiliary capacitive line driving circuit to form the auxiliary capacitive line driving circuit, one end side of the second auxiliary capacitive voltage supply line being located out of the auxiliary capacitive line driving circuit, the second auxiliary capacitive voltage being supplied to the second auxiliary capacitive voltage supply line from the one end side, and a power supply line which extends within the logic circuit to form the logic circuit, one end side of the power supply line being located out of the logic circuit;
an opposite substrate arranged opposite to the array substrate with a gap; and
a liquid crystal layer held between the array substrate and the opposite substrate,
wherein each of the pixels includes a switching element provided in the vicinity of an intersection of the signal line and the scanning line, a pixel electrode which is electrically connected to the switching element, and an auxiliary capacitive element including an auxiliary capacitive electrode which is arranged opposite to the auxiliary capacitive line via an insulating film and which is electrically connected to the pixel electrode;
a first common line which is the first auxiliary capacitive voltage supply line or the second auxiliary capacitive voltage supply line and a second common line which is the power supply line are connected to each other on the one end side and are in a non-connected state in parts other than the part on the one end side;
a common voltage is supplied to the first common line and the second common line from the one end side;
the array substrate further includes another power supply line which extends within the logic circuit to form the logic circuit, one end side of the other power supply line being located out of the logic circuit;
one of the power supply line and the other power supply line is a high-level power supply line to which a high-level voltage is supplied from the one end side, and the other is a low-level power supply line to which a low-level voltage is supplied from the one end side;
the array substrate further includes a plurality of pads provided outside the display region;
the first common line and the second common line are connected to a common pad of the pads on the one end side; and
the common voltage is supplied to the first common line and the second common line via the common pad.

10. A liquid crystal display comprising:
an array substrate, the array substrate including a plurality of signal lines, a plurality of scanning lines, a plurality of auxiliary capacitive lines, a plurality of pixels provided in a display region where the signal lines, the scanning lines and the auxiliary capacitive lines intersect each other, an auxiliary capacitive line driving circuit which is connected to the auxiliary capacitive lines and which alternately supplies the auxiliary capacitive lines with a first auxiliary capacitive voltage and a second auxiliary capacitive voltage at given periods, the second auxiliary capacitive voltage being different in potential from the first auxiliary capacitive voltage, a logic circuit which drives the scanning lines and the auxiliary capacitive lines, a first auxiliary capacitive voltage supply line which extends within the auxiliary capacitive line driving circuit to form the auxiliary capacitive line driving circuit, one end side of the first auxiliary capacitive voltage supply line being located out of the auxiliary capacitive line driving circuit, the first auxiliary capacitive voltage being supplied to the first auxiliary capacitive voltage supply line from the one end side, a second auxiliary capacitive voltage supply line which extends within the auxiliary capacitive line driving circuit to form the auxiliary capacitive line driving circuit, one end side of the second auxiliary capacitive voltage supply line being located out of the auxiliary capacitive line driving circuit, the second auxiliary capacitive voltage being supplied to the second auxiliary capacitive voltage supply line from the one end side, and a power supply line which extends within the logic circuit to form the logic circuit, one end side of the power supply line being located out of the logic circuit;
an opposite substrate arranged opposite to the array substrate with a gap; and
a liquid crystal layer held between the array substrate and the opposite substrate,
wherein each of the pixels includes a switching element provided in the vicinity of an intersection of the signal line and the scanning line, a pixel electrode which is electrically connected to the switching element, and an auxiliary capacitive element including an auxiliary capacitive electrode which is arranged opposite to the auxiliary capacitive line via an insulating film and which is electrically connected to the pixel electrode;
a first common line which is the first auxiliary capacitive voltage supply line or the second auxiliary capacitive voltage supply line and a second common line which is the power supply line are connected to each other on the one end side and are in a non-connected state in parts other than the part on the one end side;
a common voltage is supplied to the first common line and the second common line from the one end side;
the array substrate further includes another power supply line which extends within the logic circuit to form the logic circuit, one end side of the other power supply line being located out of the logic circuit;
one of the power supply line and the other power supply fine is a high-level power supply line to which a high-level voltage is supplied from the one end side, and the other is a low-level power supply line to which a low-level voltage is supplied from the one end side; and
the value of electric resistance ranging from a grounded portion to the auxiliary capacitive line driving circuit through the second auxiliary capacitive voltage supply line is lower than the value of electric resistance ranging from the grounded portion to the logic circuit through the low-level power supply line.

11. A liquid crystal display comprising:
an array substrate, the array substrate including a plurality of signal lines, a plurality of scanning lines, a plurality of auxiliary capacitive lines, a plurality of pixels provided in a display region where the signal lines, the scanning lines and the auxiliary capacitive lines intersect each other, an auxiliary capacitive line driving circuit which is connected to the auxiliary capacitive lines and which alternately supplies the auxiliary capacitive lines with a first auxiliary capacitive voltage and a second auxiliary capacitive voltage at given periods, the second auxiliary capacitive voltage being different in potential from the first auxiliary capacitive voltage, a logic circuit which drives the scanning lines and the auxiliary capacitive lines, a first auxiliary capacitive voltage supply line which extends within the auxiliary capacitive line driving circuit to form the auxiliary capacitive line driving circuit, one end side of the first auxiliary capacitive voltage supply line being located out of the auxiliary capacitive line driving circuit, the first auxiliary capacitive voltage being supplied to the first auxiliary capacitive voltage supply line from the one end side, a second auxiliary capacitive voltage supply line which extends within the auxiliary capacitive line driving circuit to form the auxiliary capacitive line driving circuit, one end side of the second auxiliary capacitive voltage supply line being located out of the auxiliary capacitive line driving circuit, the second auxiliary capacitive voltage being supplied to the second auxiliary capacitive voltage supply line from the one end side, and a power supply line which extends within the logic circuit to form the logic circuit, one end side of the power supply line being located out of the logic circuit;

an opposite substrate arranged opposite to the array substrate with a gap;

a liquid crystal layer held between the array substrate and the opposite substrate; and a sealing member provided around the display region and formed between the array substrate and the opposite substrate, wherein each of the pixels includes a switching element provided in the vicinity of an intersection of the signal line and the scanning line, a pixel electrode which is electrically connected to the switching element, and an auxiliary capacitive element including an auxiliary capacitive electrode which is arranged opposite to the auxiliary capacitive line via an insulating film and which is electrically connected to the pixel electrode;

a first common line which is the first auxiliary capacitive voltage supply line or the second auxiliary capacitive voltage supply line and a second common line which is the power supply line are connected to each other on the one end side and are in a non-connected state in parts other than the part on the one end side;

a common voltage is supplied to the first common line and the second common line from the one end side;

the array substrate further includes another power supply line which extends within the logic circuit to form the logic circuit, one end side of the other power supply line being located out of the logic circuit;

one of the power supply line and the other power supply line is a high-level power supply line to which a high-level voltage is supplied from the one end side, and the other is a low-level power supply line to which a low-level voltage is supplied from the one end side;

the array substrate further includes
  a plurality of pads provided outside the display region and the sealing member; and
  a connection line which is connected to one of the pads and which extends toward the display region beyond the sealing member;

one end side of the first common line and one end side of the second common line being connected to the connection line in a region between the peripheral edge of the display region and the sealing member; and the common voltage being supplied to the first common line and the second common line via the pad and the connection line.

12. A liquid crystal display comprising:

an array substrate, the array substrate including a plurality of signal lines, a plurality of scanning lines, a plurality of auxiliary capacitive lines, a plurality of pixels provided in a display region where the signal lines, the scanning lines and the auxiliary capacitive lines intersect each other, an auxiliary capacitive line driving circuit which is connected to the auxiliary capacitive lines and which alternately supplies the auxiliary capacitive lines with a first auxiliary capacitive voltage and a second auxiliary capacitive voltage at given periods, the second auxiliary capacitive voltage being different in potential from the first auxiliary capacitive voltage, a logic circuit which drives the scanning lines and the auxiliary capacitive lines, a first auxiliary capacitive voltage supply line which extends within the auxiliary capacitive line driving circuit to form the auxiliary capacitive line driving circuit, one end side of the first auxiliary capacitive voltage supply line being located out of the auxiliary capacitive line driving circuit, the first auxiliary capacitive voltage being supplied to the first auxiliary capacitive voltage supply line from the one end side, a second auxiliary capacitive voltage supply line which extends within the auxiliary capacitive line driving circuit to form the auxiliary capacitive line driving circuit, one end side of the second auxiliary capacitive voltage supply line being located out of the auxiliary capacitive line driving circuit, the second auxiliary capacitive voltage being supplied to the second auxiliary capacitive voltage supply line from the one end side, and a power supply line which extends within the logic circuit to form the logic circuit, one end side of the power supply line being located out of the logic circuit;

an opposite substrate arranged opposite to the array substrate with a gap; and a liquid crystal layer held between the array substrate and the opposite substrate, wherein each of the pixels includes a switching element provided in the vicinity of an intersection of the signal line and the scanning line, a pixel electrode which is electrically connected to the switching element, and an auxiliary capacitive element including an auxiliary capacitive electrode which is arranged opposite to the auxiliary capacitive line via an insulating film and which is electrically connected to the pixel electrode;

a first common line which is the first auxiliary capacitive voltage supply line or the second auxiliary capacitive voltage supply line and a second common line which is the power supply line are connected to each other on the one end side and are in a non-connected state in parts other than the part on the one end side;

a common voltage is supplied to the first common line and the second common line from the one end side;

the array substrate further includes a plurality of pads provided outside the display region;

the first common line and the second common line are connected to a common pad of the pads on the one end side; and the common voltage is supplied to the first common line and the second common line via the common pad.

13. A liquid crystal display comprising:

an array substrate, the array substrate including a plurality of signal lines, a plurality of scanning lines, a plurality of auxiliary capacitive lines, a plurality of pixels provided in a display region where the signal lines, the scanning lines and the auxiliary capacitive lines intersect each other, an auxiliary capacitive line driving circuit which is connected to the auxiliary capacitive lines and which alternately supplies the auxiliary capacitive lines with a first auxiliary capacitive voltage and a second auxiliary capacitive voltage at given periods, the second auxiliary capacitive voltage being different in potential from the first auxiliary capacitive voltage, a logic circuit which drives the scanning lines and the auxiliary capacitive lines, a first auxiliary capacitive voltage supply line which extends within the auxiliary capacitive line driving circuit to form the auxiliary capacitive line driving circuit, one end side of the first auxiliary capacitive voltage supply line being located out of the auxiliary capacitive line driving circuit, the first auxiliary capacitive voltage being supplied to the first auxiliary capacitive voltage supply line from the one end side, a second auxiliary capacitive voltage supply line which extends within the auxiliary capacitive line driving circuit to form the auxiliary capacitive line driving circuit, one end side of the second auxiliary capacitive voltage supply line being located out of the auxiliary capacitive line driving circuit, the second auxiliary capacitive voltage being supplied to the second auxiliary capacitive voltage supply line from the one end side, and a power supply line which extends within the logic circuit to form the logic circuit, one end side of the power supply line being located out of the logic circuit:

an opposite substrate arranged opposite to the array substrate with a gap;

a liquid crystal layer held between the array substrate and the opposite substrate; and a sealing member provided around the display region and formed between the array substrate and the opposite substrate, wherein each of the pixels includes a switching element provided in the vicinity of an intersection of the signal line and the scanning line, a pixel electrode which is electrically connected to the switching element, and an auxiliary capacitive element including an auxiliary capacitive electrode which is arranged opposite to the auxiliary capacitive line via an insulating film and which is electrically connected to the pixel electrode;

a first common line which is the first auxiliary capacitive voltage supply line or the second auxiliary capacitive voltage supply line and a second common line which is the power supply line are connected to each other on the one end side and are in a non-connected state in parts other than the part on the one end side;

a common voltage is supplied to the first common line and the second common line from the one end side;

the array substrate further includes
a plurality of pads provided outside the display region and the sealing member; and
a connection line which is connected to one of the pads and which extends toward the display region beyond the sealing member;

one end side of the first common line and one end side of the second common line being connected to the connection line in a region between the peripheral edge of the display region and the sealing member; and the common voltage being supplied to the first common wiring line and the second common line via the pad and the connection line.

\* \* \* \* \*

UNITED STATES PATENT AND TRADEMARK OFFICE
CERTIFICATE OF CORRECTION

PATENT NO. : 8,456,581 B2  
APPLICATION NO. : 12/497277  
DATED : June 4, 2013  
INVENTOR(S) : Kimura Page 1 of 1

It is certified that error appears in the above-identified patent and that said Letters Patent is hereby corrected as shown below:

Title page, item (73), Assignee, "Toshiba Mobile Display Co., Ltd., Tokyo (JP)" should read --Japan Display Central Inc., Saitama (JP)--.

In the Claims

Claim 5, column 11, line 64, "power supply fine" should read --power supply--.

Signed and Sealed this  
Twenty-second Day of October, 2013

Teresa Stanek Rea  
*Deputy Director of the United States Patent and Trademark Office*